US008818206B2

(12) United States Patent
Frankel

(10) Patent No.: US 8,818,206 B2
(45) Date of Patent: Aug. 26, 2014

(54) ELECTRICAL DOMAIN SUPPRESSION OF LINEAR CROSSTALK IN OPTICAL COMMUNICATION SYSTEMS

(75) Inventor: Michael Y. Frankel, Baltimore, MD (US)

(73) Assignee: Ciena Corporation, Hanover, MD (US)

( * ) Notice: Subject to any disclaimer, the term of this patent is extended or adjusted under 35 U.S.C. 154(b) by 871 days.

(21) Appl. No.: 12/490,606

(22) Filed: Jun. 24, 2009

(65) Prior Publication Data
US 2010/0329694 A1 Dec. 30, 2010

(51) Int. Cl.
*H04B 10/00* (2013.01)
*H04B 10/12* (2006.01)
*H04B 10/04* (2006.01)

(52) U.S. Cl.
USPC .......... 398/192; 398/119; 398/136; 398/140; 398/147; 398/150; 398/158; 398/159; 398/193; 398/194

(58) Field of Classification Search
None
See application file for complete search history.

(56) References Cited

U.S. PATENT DOCUMENTS

| | | | |
|---|---|---|---|
| 5,777,777 A * | 7/1998 | Kaste et al. | 359/245 |
| 7,382,985 B2 | 6/2008 | Roberts et al. | |
| 2003/0128917 A1 * | 7/2003 | Turpin et al. | 385/24 |
| 2004/0067064 A1 * | 4/2004 | McNicol et al. | 398/158 |
| 2004/0071473 A1 * | 4/2004 | Lee et al. | 398/186 |
| 2004/0197103 A1 | 10/2004 | Roberts et al. | |
| 2005/0135816 A1 * | 6/2005 | Han et al. | 398/188 |
| 2006/0024069 A1 * | 2/2006 | Roberts et al. | 398/198 |
| 2006/0078336 A1 | 4/2006 | McNicol et al. | |
| 2006/0159002 A1 * | 7/2006 | Kim et al. | 370/201 |
| 2007/0274628 A1 * | 11/2007 | Hayee et al. | 385/24 |

OTHER PUBLICATIONS

[Winzer] P.J. Winzer, et al., Coherent crosstalk in ultradense WDM systems, J. Lightwave Techn., vol. 23, No. 4, Apr. 2005.
[Bosco] G. Bosco, A. Carena, V. Curri, R. Gaudino, and P. Poggiolini, "On the use of NRZ, RZ, and CSRZ modulation at 40 Gb/s with narrow DWDM channel spacing," J. Lightw. Technol., vol. 20, No. 9, pp. 1694-1704, Sep. 2002.
[Hodzic] A. Hodzic, M. Winter, B. Konrad, S. Randel, and K. Petermann, "Optimized filtering for 40-Gb/s/ch-based DWDM transmission systems over standard single-mode fiber," IEEE Photon. Technol. Lett., vol. 15, No. 7, pp. 1002-1004, Jul. 2003.
[Suzuki] S. Suzuki and Y. Kokubun, "Minimum rejection floor of wavelength filter required for ultimate spectral efficiency in DWDM systems," in Proc. LEOS '03, 2003, TuQ3, pp. 320-321.

(Continued)

*Primary Examiner* — Darren E Wolf
(74) *Attorney, Agent, or Firm* — Clements Bernard PLLC; Christopher L. Bernard; Lawrence A. Baratta, Jr.

(57) ABSTRACT

The present disclosure provides electrical domain suppression of linear crosstalk in optical communication systems using single-carrier implementations. This electrical domain suppression applies spectral shaping in the electronic radio frequency (RF) domain. Advantageously, spectral shaping in the electronic RF domain transfers system complexity from the bulk optical domain into the highly integrated CMOS (or equivalent) domain. The spectral shaping can include electronic circuitry including an electrical filtering block and a signal linearization block prior to optical modulation. The electrical filtering block suppresses coherent interference terms and can include an RF-domain low pass filter. The signal linearization block linearizes modulator response to compensate spectral regrowth due to nonlinear mixing in the modulator.

18 Claims, 10 Drawing Sheets

(56) References Cited

OTHER PUBLICATIONS

[Shieh] W. Shieh, et al. Coherent optial OFDM: theory and design,: Optics Express, vol. 16, No. 2, pp. 841-859.
[Jansen] S. L. Jansen, "Optical OFDM, a hype or is it for real?" ECOC 2008, paper Mo.3.E.3.
[Doan] Millimeter-wave CMOS design, Doan, C.H. Emami, S. Niknejad, A.M. Brodersen, R.W., IEEE JSSC, Jan. 2005, vol. 40, Issue 1, pp. 144-155.
[Chan] Microwave coplanar filters on Si substrates, Chan, K.T. Chin, A. Kuo, J.T. Chang, C.Y. Duh, D.S. Lin, W.J. Chunxiang Zhu Li, M.F. Dim-Lee Kwong, IEEE Microwave Symposium Digest, Jun 2003, pp. 1909-1912.
[Gilbert] B. Gilbert, "A monolithic microsystem for analog synthesis of trigonometric functions and their inverses," IEEE JSSC, vol. sc-17, No. 6, pp. 1179-1191.
[Constandinou] Constandinou T.G., Georgiou, J, A Micropower Arcsine Circuit for Tilt Processing, Electronics Letters, 2008, vol. 44, pp. 1336-1338.

* cited by examiner

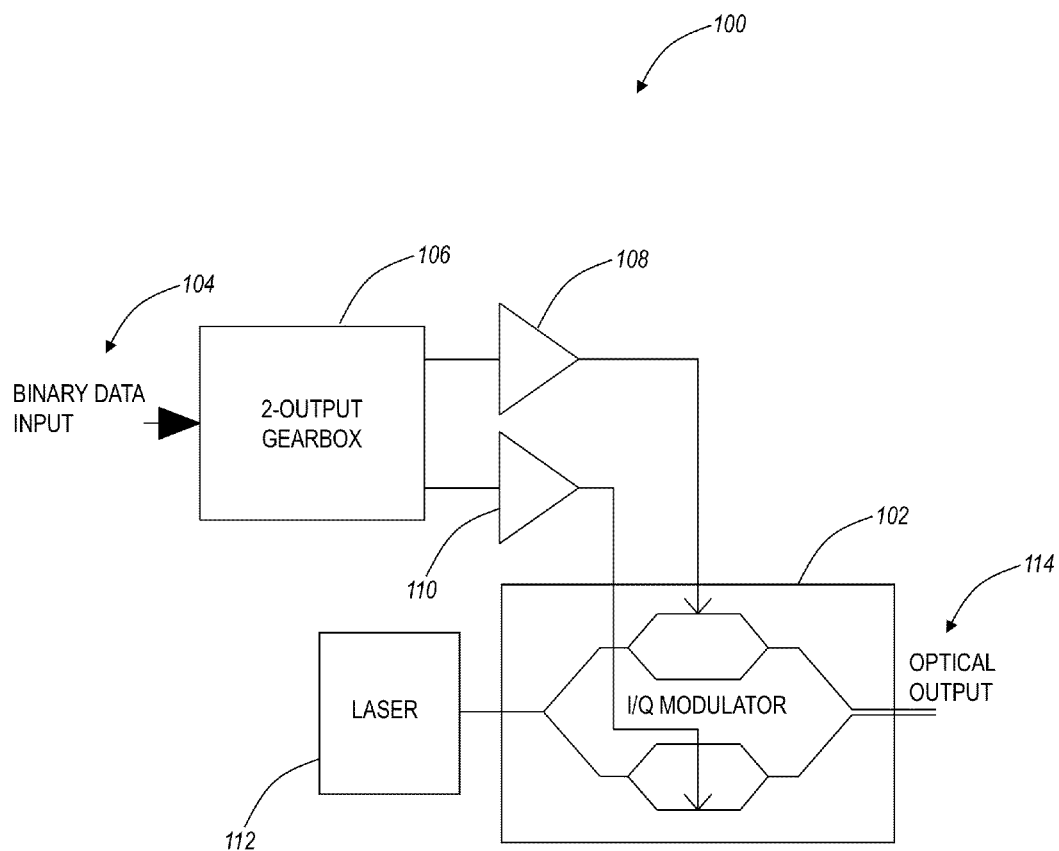
*FIG. 1 – prior art*

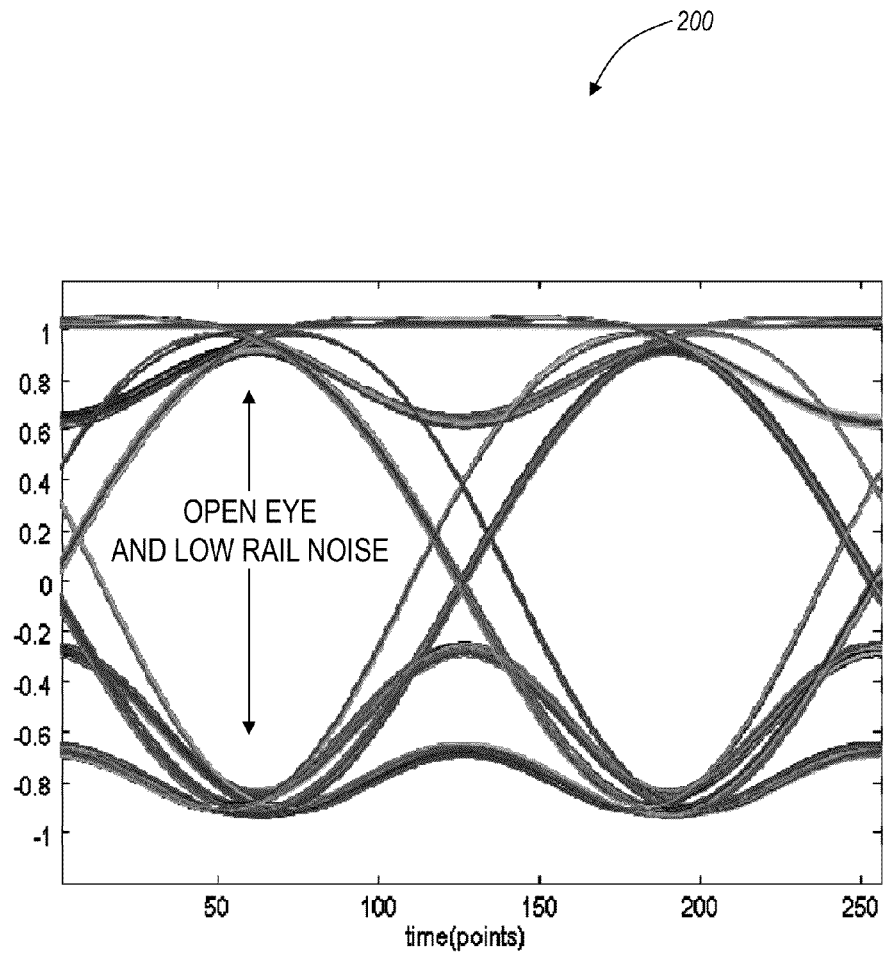
FIG. 2 – prior art

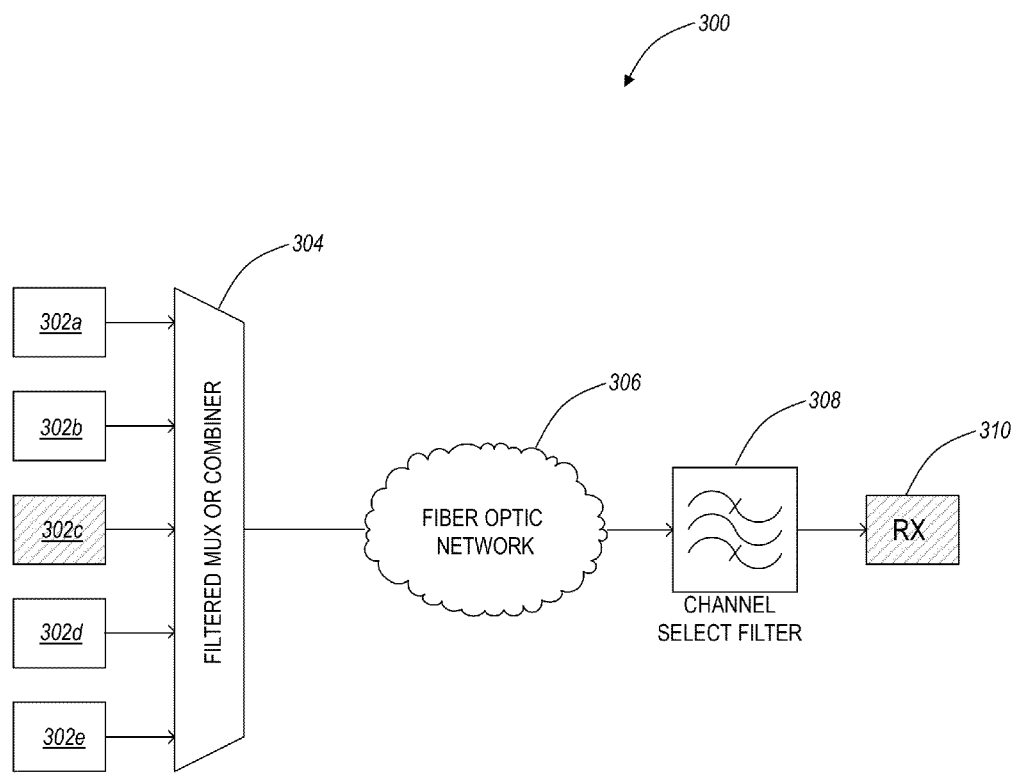
*FIG. 3 – prior art*

**FIG. 4 –
prior art**
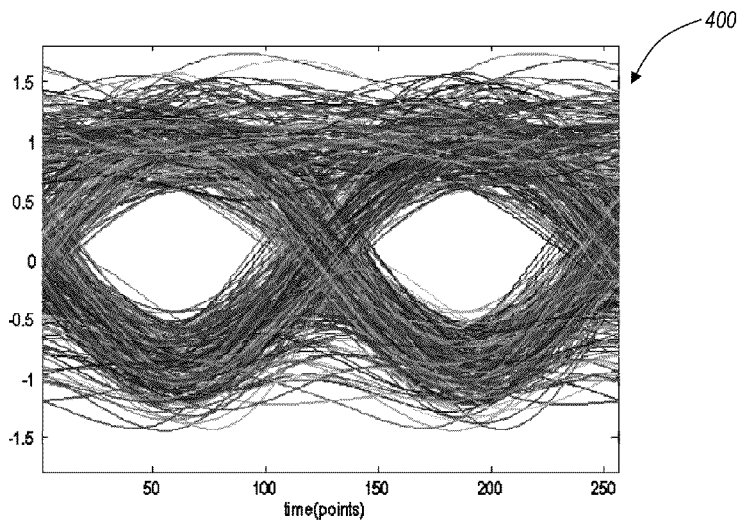
**FIG. 5 –
prior art**
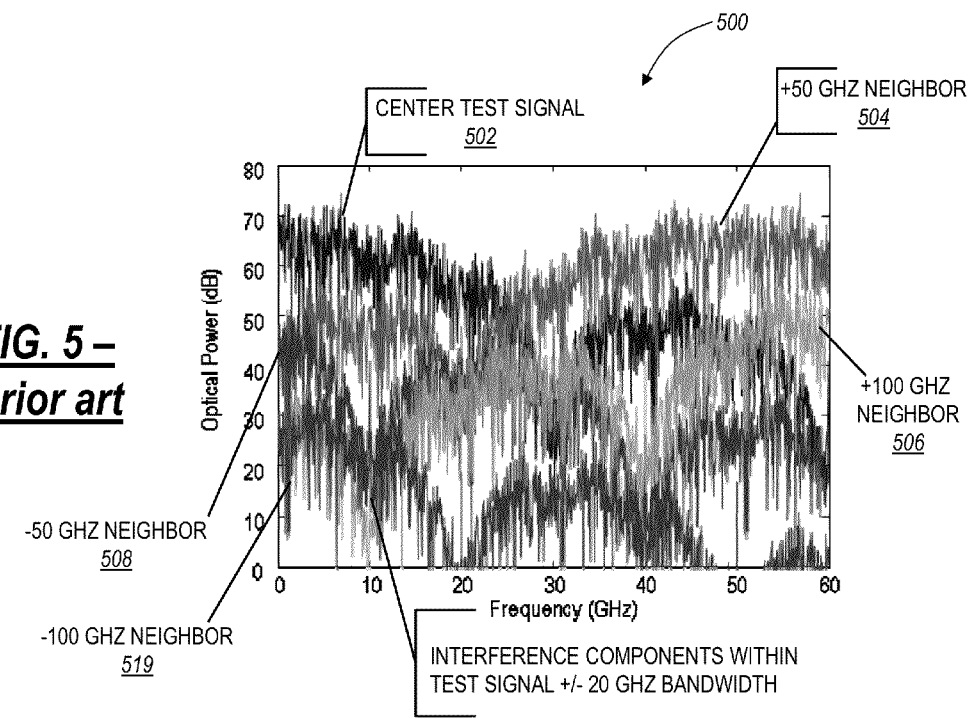

NOTE LARGE INTERFERENCE SUPPRESSION WITH FAR-OFF NEIGHBORS BEING COMPLETELY ELIMINATED

ELECTRICAL DOMAIN SUPPRESSION OF LINEAR CROSSTALK IN OPTICAL COMMUNICATION SYSTEMS

FIELD OF THE INVENTION

The present invention relates generally to optical communication systems. More particularly, the present invention relates to electrical domain suppression systems and methods of linear crosstalk in optical communication systems with single-carrier implementations that apply spectral shaping in the electronic radio frequency (RF) domain.

BACKGROUND OF THE INVENTION

Fiber-optic communication networks are experiencing rapidly increasing growth of capacity. This capacity growth is satisfied both through increased data rate of individual wavelength division multiplexed (WDM) channels (e.g., 10 Gbps to 40 Gbps to 100 Gbps and beyond) and with decreasing spacing between WDM channels, i.e. decreased spectral spacing such as 100 GHz to 50 GHz. Both of these approaches lead to an increased spectral overlap between channels thereby increasing linear crosstalk between channels. This problem has been recognized, as it leads to impairments when multiple closely-spaced WDM channels are added at Terminals or optical add-drop multiplexed (OADM) nodes, i.e. optical-to-electrical-to-optical (OEO) points in optical networks. Previous attempts to deal with this problem can be grouped into two categories: narrow-band optical filters and digital signal processing.

The first category uses narrow-band optical filters at transmitters to suppress spectral overlap between adjacent optical WDM channels. For example, P. J. Winzer, et al, 'Coherent crosstalk in ultra-dense WDM systems," J. Lightwave Techn., vol. 23, no. 4, April 2005, discuss linear cross talk penalties, and shows how these can lead to bursty error behavior. G. Bosco et al., "On the use of NRZ, RZ, and CSRZ modulation at 40 Gb/s with narrow DWDM channel spacing," J. Lightw. Technol., vol. 20, no. 9, pp. 1694-1704, September 2002, consider optical transmitter filter optimization, such that cross talk is minimized, while associated transmitted signal distortions are minimized. Similarly, Bosco et al. and A. Hodzic et al., "Optimized filtering for 40-Gb/s/ch-based DWDM transmission systems over standard single-mode fiber," IEEE Photon. Technol. Lett., vol. 15, no. 7, pp. 1002-1004, July 2003, attempt to optimize bandwidth of transmitter and receiver-side optical filters for best overall WDM channel performance.

Spectral control of WDM channels by tight optical filtering has several substantial drawbacks. Optical filters are fundamentally difficult to fabricate with precise and repeatable control of pass band amplitude and phase response. The filters are required to operate at an optical center frequency in the vicinity of 193 THz, but require bandwidths of approximately 40 GHz leading to approximately a 5000:1 aspect ratio. Also, optical filters center frequency tends to drift due to aging and temperature effects, which leads to variable impact on WDM channel performance. WDM channel laser frequency can drift which again misaligns the channel relative to the optical filter and leads to a variable impact on WDM channel performance. Additionally, the requirement for reconfigurable networks implies that a WDM channel laser frequency can change under software control. Correspondingly, optical filters have to dynamically track changes in the laser frequency, while maintaining all the other performance characteristics. Finally, optical filters, especially tunable ones, are generally physically large and expensive devices.

The second category uses sophisticated digital signal processing to partition the incoming data stream into many parallel streams, each digitally modulated onto a separate closely spaced carrier. Such approaches are known as Orthogonal Frequency Division Multiplexing (OFDM), and can produce compact signal spectra with very sharp roll-off and minimal linear cross talk Spectral control via digital signal processing, such as generation of OFDM signals also has associated drawbacks. It requires sophisticated digital circuit implementations, as well as very high speed Digital-to-Analog Converters (DAC). Such circuits require millions of gates and have correspondingly high complexity, cost and power consumption, even in latest generation Complementary metal-oxide-semiconductor (CMOS) technology. Also, OFDM modulation generally requires additional overhead for cyclic prefix, pilot tones for phase synchronization, and training sequences. All of these effectively expand signal bandwidth, increasing associated interference.

As optical networks move to data rates in excess of 100 Gbps with spectral spacing of 100 GHz or less, single-carrier implementations in WDM optical networks have a need for systems and methods to suppress linear crosstalk while overcoming the aforementioned limitations described above.

BRIEF SUMMARY OF THE INVENTION

In various exemplary embodiments, the present invention provides electrical domain suppression of linear crosstalk in optical communication systems using single-carrier implementations. This electrical domain suppression applies spectral shaping in the electronic radio frequency (RF) domain. Advantageously, spectral shaping in the electronic RF domain transfers system complexity from the bulk optical domain into the highly integrated CMOS (or equivalent) domain. The spectral shaping can include electronic circuitry including an electrical filtering block and a signal linearization block prior to optical modulation. The electrical filtering block suppresses interference terms and can include an RF-domain low pass filter. The signal linearization block linearizes modulator response to compensate spectral regrowth due to nonlinear mixing in the modulator.

In an exemplary embodiment of the present invention, a system for electrical domain suppression of linear crosstalk includes an electrical filtering circuit adapted to receive a data stream; an optical modulator receiving the data stream from the electrical filtering circuit; wherein the electrical filtering circuit is configured with a pass-band substantially equal to a frequency channel spacing of a wavelength division multiplexed system. The electrical filtering circuit is configured to suppress interference terms. The electrical filtering circuit is configured to implement one of a Bessel, a Butterworth, a Chebyshev, and an Elliptic filter. The electrical filtering circuit can be part of a complementary metal-oxide-semiconductor integrated circuit with additional modulator functions of the optical modulator. The system further includes a signal linearization circuit configured to linearize an output of the electrical filtering circuit prior to the optical modulator. The signal linearization circuit is configured to implement an ARCSIN($V_{in}$) function or to reduce a modulation index of the modulator to approximately 50% range. The electrical filtering circuit and the signal linearization circuit can be part of a complementary metal-oxide-semiconductor integrated circuit with additional modulator functions of the modulator. Optionally, the modulator is part of a wavelength division multiplexed system including a plurality of optical channels each with a single-stream modulation format of the data stream on a single wavelength carrier. The single-stream modulation format includes one of Non-Return to Zero (NRZ), Return-to-Zero (RZ), Return-to-Zero Differential Phase Shift Keying (RZDPSK), Quadrature Phase Shift Keying (QPSK), Phase Shift Keying (PSK), Differential Quadrature Phase Shift Keying (DQPSK), Polarization Multiplexing, and combinations thereof.

In another exemplary embodiment of the present invention, a method for electrical domain suppression of linear crosstalk in an optical communication system includes adapting an input signal for modulation; electrically filtering the adapted input signal; linearizing the electrically filtered signal; and modulating a laser with the linearized, electrically filtered signal. The electrically filtering includes Radio Frequency domain low-pass filtering and implements one of a Bessel, a Butterworth, a Chebyshev, and an Elliptic filter. The linearizing is configured to provide electrical-to-optical transfer function linearization. The linearizing includes implementing an ARCSIN($V_{in}$) function or reducing a modulation index of a modulator to approximately 50% range. Optionally, the electrically filtering and linearizing are implemented in a complementary metal-oxide-semiconductor integrated circuit in a modulator. The method further includes combining a plurality of modulated optical wavelengths in a wavelength division multiplexed optical system; wherein the adapting, electrically filtering, linearizing, and modulating steps are performed on at least one of the plurality of modulated optical wavelengths.

In yet another exemplary embodiment of the present invention, a wavelength division multiplexed system with electrical domain suppression of linear crosstalk includes a plurality of optical transmitters; an optical combiner connected to each of the plurality of optical transmitters and configured to multiplex the plurality of optical transmitters; wherein at least one of the plurality of optical transmitters includes an electrical filtering circuit configured to provide electrical domain suppression of linear crosstalk by performing a low pass filtering on the at least one of the plurality of optical transmitters. The at least one of the plurality of optical transmitters further includes a signal linearization circuit configured to linearize an output of the electrical filtering circuit prior to the optical modulator; and wherein the signal linearization circuit is configured to implement an ARCSIN($V_{in}$) function or to reduce a modulation index of the modulator to approximately 50% range. The electrical filtering circuit and the signal linearization circuit are part of a complementary metal-oxide-semiconductor integrated circuit contained in the at least one of the plurality of optical transmitters. The plurality of optical transmitters each include an output optical signal with a single-stream modulation format comprising one of Non-Return to Zero (NRZ), Return-to-Zero (RZ), Return-to-Zero Differential Phase Shift Keying (RZDPSK), Quadrature Phase Shift Keying (QPSK), Phase Shift Keying (PSK), Differential Quadrature Phase Shift Keying (DQPSK), Polarization Multiplexing, and combinations thereof.

BRIEF DESCRIPTION OF THE DRAWINGS

The present invention is illustrated and described herein with reference to the various drawings, in which like reference numbers denote like method steps and/or system components, respectively, and in which:

FIG. 1 is a typical QPSK system illustrating signal flow based on an I/Q modulator;

FIG. 2 is a typical received eye diagram assuming a direct detection receiver based on a one-bit delay line interferometer;

FIG. 3 is an optical communication system with five adjacent channels added through a passive optical combiner;

FIG. 4 is a received eye diagram of the middle channel in FIG. 3;

FIG. 5 is a received frequency power plot of the middle channel in FIG. 3;

DETAILED DESCRIPTION OF THE INVENTION

Figure 6:
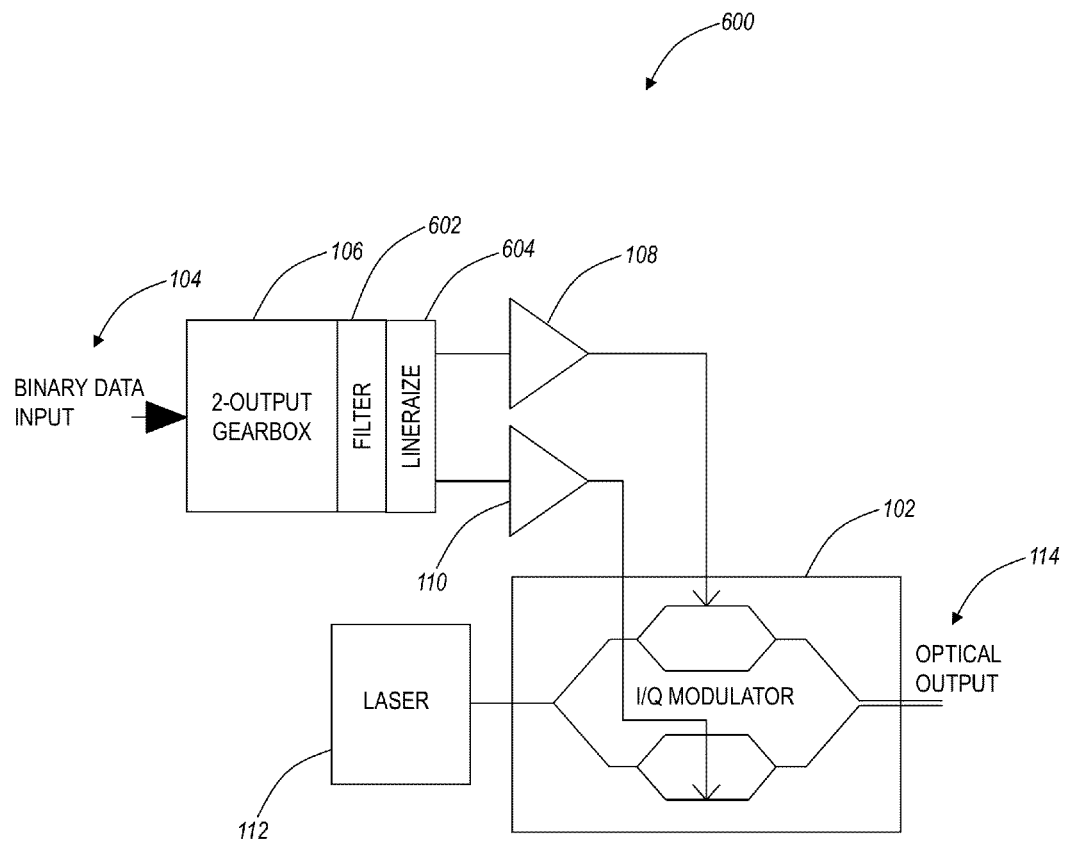
FIG. 6 is a QPSK system illustrating signal flow is based on an I/Q modulator and with electrical domain suppression of linear crosstalk according to an exemplary embodiment of the present invention.

In various exemplary embodiments, the present invention provides electrical domain suppression of linear crosstalk in optical communication systems using single-carrier implementations. This electrical domain suppression applies spectral shaping in the electronic radio frequency (RF) domain. Advantageously, spectral shaping in the electronic RF domain transfers system complexity from the bulk optical domain into the highly integrated CMOS (or equivalent) domain. The spectral shaping can include electronic circuitry including an electrical filtering block and a signal linearization block prior to optical modulation. The electrical filtering block suppresses interference terms and can include an RF-domain low pass filter. The signal linearization block linearizes modulator response to compensate spectral regrowth due to nonlinear mixing in the modulator. The electrical domain suppression of linear crosstalk constrains the optical signal spectrum at the transmitter with a simple and cost-effective implementation.

The operating principles and simulation results of the present invention are described herein based on an exemplary Quadrature Phase Shift Keying (QPSK) modulation format operating at a 30 Gbaud rate, with channels spectrally positioned on the 50 GHz ITU (International Telecommunication Union) grid. This modulation format, when used in a dual-polarization implementation, i.e. polarization multiplexed, carries an aggregate bit rate of 120 Gbps, and provides for approximately 100 Gbps worth of data payload, with an additional approximately 20 Gbps overhead for signal framing structures (e.g., Optical Transport Network (OTN)) and forward error correction (FEC) encoding. However, the operating principles of the present invention apply and contemplate use with any modulation format (e.g., Non-Return to Zero (NRZ), Return-to-Zero Differential Phase Shift Keying (RZDPSK), and the like), data rate (10 Gbps, 40 Gbps, etc.), channel frequency separations (100 GHz, 50 GHz, 25 GHz, etc.), and the like. Advantageously, the present invention provides a cost effective design for optical WDM that is suitable for 100+ Gbps data rates and ultra-dense WDM design while eliminating costly and bulky optical filters.

Referring to FIG. 1, a typical QPSK system 100 signal flow is illustrated based on an I/Q modulator 102. The QPSK system 100 includes a binary data input stream 104 that includes the aggregate bit rate. The input stream 104 is provided to a 2-output gearbox 106 that separates the input stream 104 into a quadrature (Q) and an in-phase (I) signal that are provided separately to modulator drivers 108, 110, i.e. a quadrature modulator driver 108 and an in-phase modulator driver 110. Note, the 2-output gearbox 106 is specific to QPSK format, since it requires two data signal. So, in this example, the output gearbox 106 maps a 120 Gbps into 2×60 Gbps signals. For a differential QPSK (DQPSK) format, the output gearbox 106 requires a pre-coder as well. For other modulation formats, e.g. NRZ, RZ, etc., the output gearbox 106 is omitted. The modulator drivers 108, 110 in turn drive separate arms of the I/Q modulator 102 that is connected to a laser 112. The output of the I/Q modulator 102 is a QPSK modulated signal 114.

Referring to FIG. 2, a typical received eye diagram 200 is illustrated assuming a direct detection receiver based on a one-bit delay line interferometer. The eye diagram 200 assumes a single channel without transmitter filtering in either the optical or electrical domain, i.e. a received version of the QPSK modulated signal 114 of FIG. 1. As illustrated in the eye diagram 200, there is some residual distortion due to a channel selection filter, i.e. an optical de-multiplexer with 40 GHz bandwidth. The channel selection filter somewhat over filters the received channel spectrum, but still provides good receiver sensitivity.

Referring to FIG. 3, an optical communication system 300 is illustrated with five adjacent channels 302a-302e added through a passive optical combiner 304. Specifically for illustration purposes and the accompanying eye diagrams and frequency power plots, each of the channels 302a-302e includes a QPSK modulated signal and each of the channels 302a-302e are spectrally spaced apart by 50 GHz. For example, each of the channels 302a-302e can include 120 Gbps data rate. The optical communication system 300 represents a typical WDM optical communication system, i.e. multiple channels 302a-302e on different wavelengths provided through the optical combiner 304, i.e. multiplexer, coupler, etc. These channels 302a-302e collectively propagate in a fiber optic network 306 thereby experiencing distortion effects such as linear crosstalk between channels 302a-302e. In FIG. 3, the performance of the center channel 302c is of interested due to the neighboring channels 302a, 302b, 302d, 302e serving as possible interfering sources (for illustration purposes herein). The channels 302a-302e propagate within the fiber optic network 306 and a channel select filter 308 is used to select and provide the channel 302c to a receiver 310 where performance of the channel 302c can be monitored.

Referring to FIGS. 4 and 5, an eye diagram 400 and a frequency power plot 500 are illustrated for the channel 302c at the receiver 310 in FIG. 3. As shown in FIG. 3 with the neighboring channels 302a, 302b, 302d, 302e, once additional 120 Gbps channels are added at 50 GHz spacing, a strong coherent interference noise is observed, as shown in the eye diagram 400. The frequency power plot 500 illustrates corresponding optical spectra, with individual channels 302a-302e. Spectrum 502 is the desired channel 302c for demonstration purposes herein, centered at relative optical ZERO frequency. Spectrum 504 is a near neighbor channel offset to +50 GHz, e.g. channel 302d. Spectrum 506 is near neighbor channel offset to +100 GHz, e.g. channel 302e. Spectra 508, 510 are near neighbor channels spectra offset to −50 GHz and −100 GHz respectively.

Referring to FIG. 6, a QPSK system 600 signal flow is illustrated based on the I/Q modulator 102 and with electrical domain suppression of linear crosstalk according to an exemplary embodiment of the present invention. In various exemplary embodiments, the present invention modifies a data path in the modulator by adding an electrical filtering block 602 and a signal linearization block 604 prior to modulation. Both the filtering block 602 and the linearization block 604 can be achieved in low-power, highly integrated CMOS technology or the like on a same chip as digital data serialization, i.e. the 2-output gearbox 106, or other modulator functions. The filtering block 602 and the linearization block 604 can be implemented in a simple, low-cost, and low-power implementation in high-volume CMOS technology. Also, the filtering block 602 as a low-pass filter can be done in a completely passive circuit. This technology is generally available and readily implementable today, requiring minimal development risk.

The electrical filtering block 602 is applied to the outputs of the 2-output gearbox 106 to suppress coherent interference terms for the QPSK system 600. Note, the present invention contemplates use with any standard, single-stream modulation format (e.g., NRZ, RZ, RZDPSK, etc.) and the electrical filtering block 602 receives a data stream adapted for the particular modulation format, e.g. here the 2-output gearbox 106 provides the two outputs for the QPSK modulator 102. The electrical filtering block 602 can include an RF-domain low pass filter (which can also be a notch filter at the channel spacing, i.e. 50 GHz, 100 GHz, etc.). The electrical filtering block 602 can be implemented as any known filter type or designed to meet specific spectral criteria. For example, the filter type can include Bessel, Butterworth, Chebyshev, Elliptic, etc. A Bessel filter is a variety of linear filter with a maximally flat group delay (linear phase response). A Butterworth filter is designed to have a frequency response which is as flat as mathematically possible in the pass-band and another name for it is maximally flat magnitude filter. A Chebyshev filter has a steeper roll-off and more pass-band ripple (type I) or stop-band ripple (type II) than Butterworth filters. An Elliptic filter has equalized ripple (equiripple) behavior in both the pass-band and the stop-band. Also, the filter can be adaptive where it can change spectral criteria if, for example, the frequency changes as might occur with a tunable laser.

Figure 7:
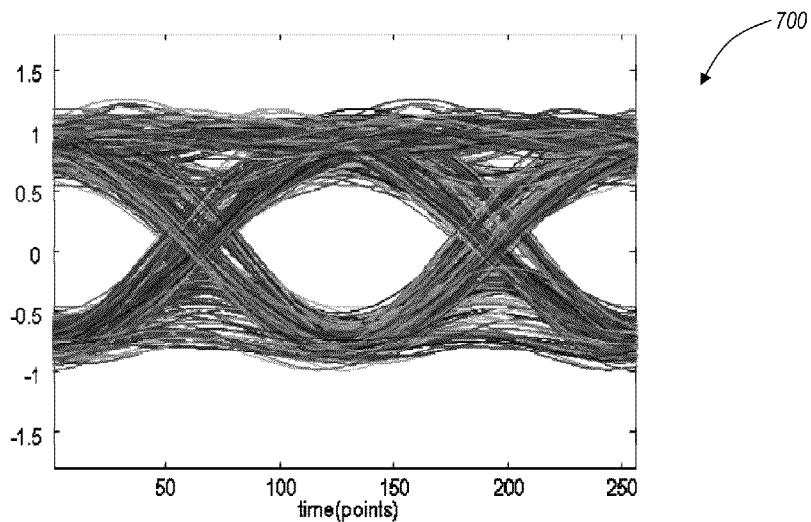
FIG. 7 is a received eye diagram of the middle channel in FIG. 3 with electrical filtering on the transmitter according to an exemplary embodiment of the present invention.
Figure 8:
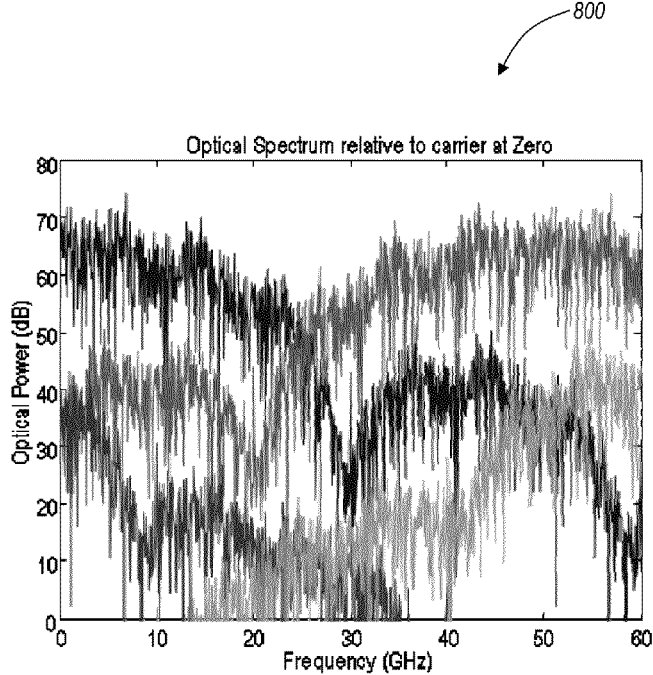
FIG. 8 is a received frequency power plot of the middle channel in FIG. 3 with electrical filtering on the transmitter according to an exemplary embodiment of the present invention.
Figure 9:
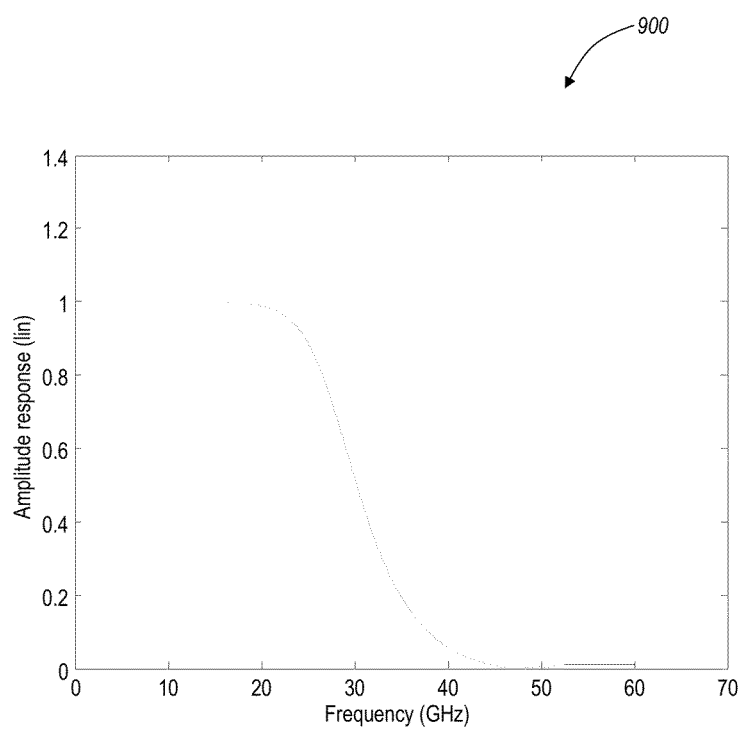
FIG. 9 is a frequency versus amplitude plot of a 45 GHz cutoff Chebyshev type II filter with order five utilizing for the electrical filtering in FIGS. 7 and 8 according to an exemplary embodiment of the present invention.

Referring to FIGS. 7 and 8, an eye diagram 700 and a frequency power plot 800 are illustrated for the channel 302c at the receiver 310 in FIG. 3 with the electrical filtering block 602 according to an exemplary embodiment of the present invention. Here, the channel 302c includes the electrical filtering block 602 but not the signal linearization block 604. In this example, the electrical filtering block 602 includes a 45 GHz cutoff Chebyshev type II filter with order five. As illustrated in the eye diagram 700 and the frequency power plot 800, there is approximately 10 dB of near neighbor suppression. However, this is much lower than one would expect based on the idealized Chebyshev response as illustrated in FIG. 9 in a frequency versus amplitude plot 900 of the 45 GHz cutoff Chebyshev type II filter with order five. The reason is because of the Sinusoidal transfer characteristic of the optical modulator, such that output optical electric field is related to the input signal drive voltage as $E_{out}=SIN(V_{in})$, for a modulator biased at the transmission null. There is considerable spectral regrowth due to nonlinear mixing in the modulator. Accordingly, the signal linearization block 604 can linearize the modulator response, i.e. the signal linearization block 604 is configured to provide electrical-to-optical transfer function linearization.

Modulator response can be linearized with the signal linearization block 604 through several mechanisms. One such mechanism includes adding an electronic $ARCSIN(V_{in})$ pre-distortion function which is well known in CMOS implementations. The $ARCSIN(V_{in})$ predistortion function can be done in a tiny and low-power analog CMOS circuit. Here, the output optical electric field becomes $E_{out}=SIN(ARCSIN(V_{in}))\sim V_{in}$. Alternately, modulators can be linearized by adding additional modulation stages, though such implementations introduce increased complexity. Also, the modulation index depth can be reduced to approximately the 50% range to operate the modulator on the substantially linear portion of the SIN curve. Such an approach results in additional optical loss, but can be acceptable.

Figure 10:
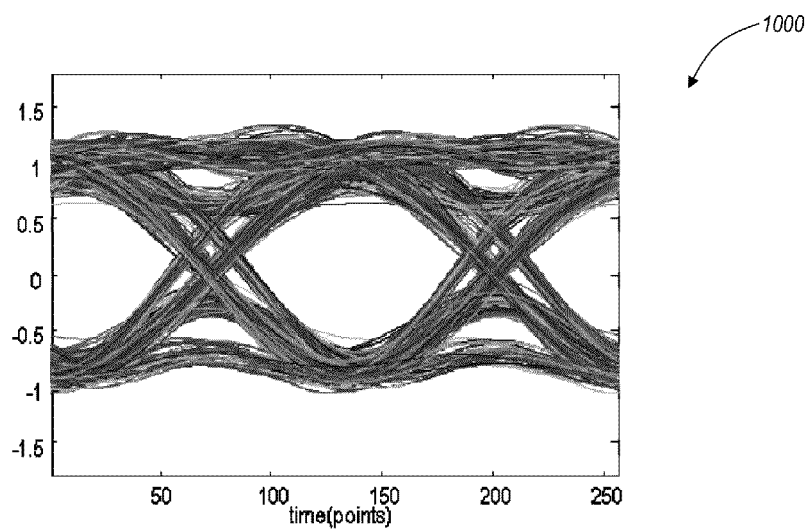
FIG. 10 is a received eye diagram of the middle channel in FIG. 3 with signal linearization utilizing an idealized ARCSIN( ) implementation on the transmitter according to an exemplary embodiment of the present invention.
Figure 11:
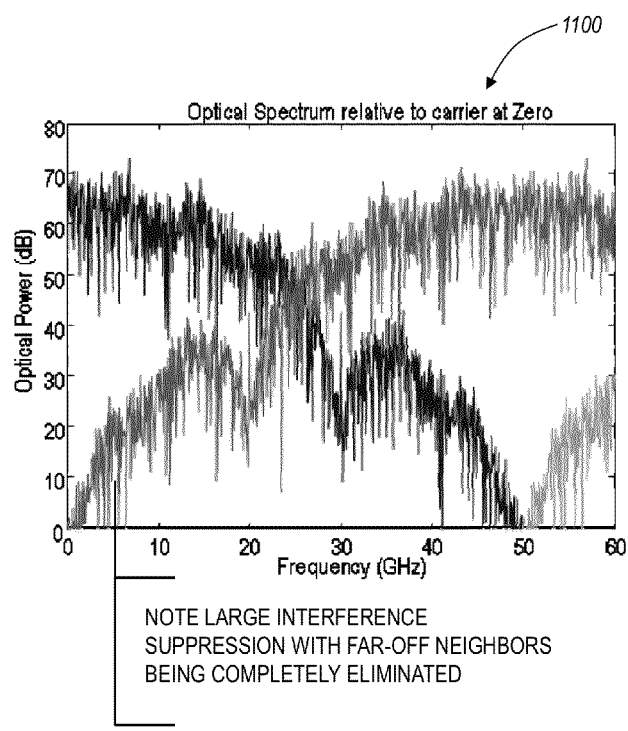
FIG. 11 is a received frequency power plot of the middle channel in FIG. 3 with signal linearization utilizing an idealized ARCSIN( ) implementation on the transmitter according to an exemplary embodiment of the present invention.

Referring to FIGS. 10 and 11, an eye diagram 1000 and a frequency power plot 1100 are illustrated for the channel 302c at the receiver 310 in FIG. 3 with the signal linearization block 604 utilizing an idealized ARCSIN(x) implementation according to an exemplary embodiment of the present invention. The output eye diagram 1000 shows substantially suppressed linear crosstalk, which is also corroborated by the optical spectra in the frequency power plot 1100 showing substantial reduction in the near neighbor spectra leaking into the desired pass band of the channel under test. While some amount of residual crosstalk and some amount of channel distortion is still observed, it is comparable to what would be observed with optimized optical filtering while still providing all the enumerated advantages described herein.

Additional benefits can be achieved with receiver-side compensation for filter-induced signal distortions. These filters achieve best performance when applied in conjunction with coherent optical receivers, but can also produce benefits in direct-detection receiver architectures.

Figure 12:
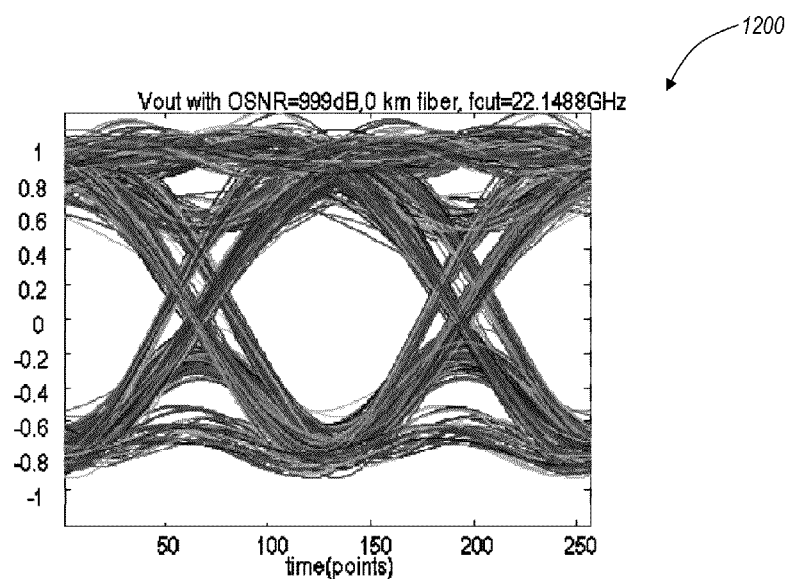
FIG. 12 is a received eye diagram of the middle channel in FIG. 3 with signal linearization utilizing a 50% modulation index on the transmitter according to an exemplary embodiment of the present invention.
Figure 13:
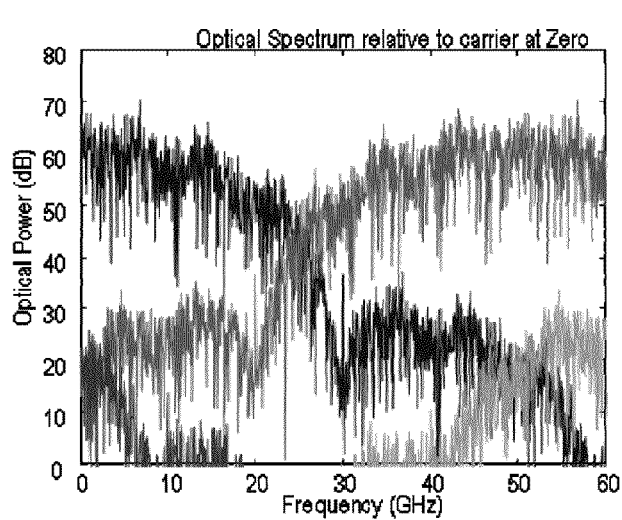
FIG. 13 is a received frequency power plot of the middle channel in FIG. 3 with signal linearization utilizing a 50% modulation index on the transmitter according to an exemplary embodiment of the present invention.

Referring to FIGS. 12 and 13, an eye diagram 1200 and a frequency power plot 1300 are illustrated for the channel 302c at the receiver 310 in FIG. 3 with the signal linearization block 604 utilizing a 50% modulation index according to an exemplary embodiment of the present invention. As shown in the FIGS. 12 and 13, performance is similar when using a 50% modulation index relative to the idealized ARCSIN( ) implementation. The trade-off relative to the idealized ARCSIN(x) implementation is reduced need for CMOS processing, at the expense of larger optical insertion loss at the optical modulator.

Figure 14:
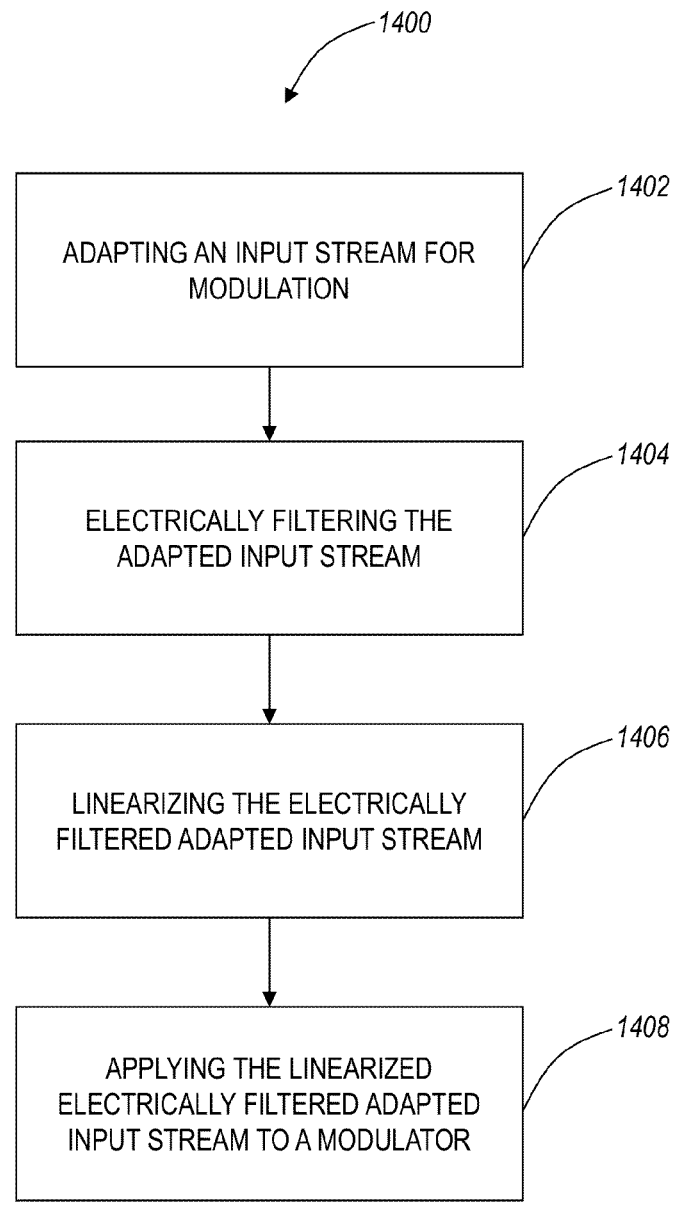
FIG. 14 is a flowchart of an electrical domain suppression method for linear crosstalk in optical communication systems according to an exemplary embodiment of the present invention.

Referring to FIG. 14, a flowchart illustrates a method 1400 for electrical domain suppression of linear crosstalk in optical communication systems according to an exemplary embodiment of the present invention. The electrical domain suppression method 1400 starts with adapting an input stream for modulation (e.g., NRZ, RZ, RZDPSK, QPSK, DQPSK, DPSK, PSK, Polarization Multiplexing (PolMux), etc.) (step 1402). For example, this step could include receiving a 120 Gbps binary data stream that includes an approximately 100 Gbps data signal that is framed and encoded with FEC for the aggregate 120 Gbps and adapting the 120 Gbps for QPSK modulation by creating a data stream for the I and Q arms of a modulator. Additionally, this adaptation step could include precoding for differential modulation formats.

The adapted input stream is electrically filtered (step 1404). This electrically filtering is to reduce linear crosstalk between adjacent channels in a WDM system. The filtering can include low-pass filtering and is performed through electronic circuitry in the RF analog domain thereby eliminating the need for an external optical filter to suppress spectral overlap between adjacent optical WDM channels. Also, this electrical implementation requires very low power and is a low complexity implementation providing a path to very dense CMOS-based integration of multiple channels. Additionally, electrical-domain filtering is completely independent of optical wavelength tuning, since it is applied to the input electrical data stream. Transmitter-side optical filtering can be completely eliminated with the present invention, and substituted with purely color-independent channel coupling. A low-cost solution to "Colorless" network implementations, i.e. wavelength-independent, with dynamic wavelength control is provided. Here, the present invention can adapt the characteristics of the filtering based upon dynamic wavelength changes at the transmitter. Electrical filters are optimized for a specific modulation format and data rate. This makes external optical system components completely format-independent, while overall system performance is still optimized as new channel circuit packs are developed and added.

This electrical filtering generally includes a pass-band substantially equal to the optical bandwidth for each channel, i.e. 100 GHz, 50 GHz, 25 GHz, etc. For example, if the optical communication system utilizing 50 GHz frequency grid spacing, the electrical filtering can have a pass-band of approximately 45 GHz. The electrical filtering can utilize any digital filtering technique such as Bessel, Butterworth, Chebyshev, Elliptic, etc. Further, this electrical filtering can be integrated in circuitry with other modulator functions.

The electrically filtered adapted input stream is linearized (step 1406). As described herein, without linearizing the modulator response, there is considerable spectral regrowth due to nonlinear mixing in the modulator. Similar to the electrical filtering, the modulator response can be linearized through electronic circuits that implement an $ARCSIN(V_{in})$ function or reduction of the modulation index to approximately the 50% range. Finally, the linearized electrically filtered adapted input stream is applied to the modulator (step 1408). For example, in a QPSK modulator, the signal is applied to I and Q arms of the modulator to provide an output optical signal that has reduced linear effects on neighboring channels through the electrical domain adjustments.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A system for electrical domain suppression of linear crosstalk, comprising:
    an analog, electrical, radio frequency (RF) domain, low pass filtering circuit adapted to receive a data stream that is split into a quadrature signal and an in-phase signal;
    an analog signal linearization circuit configured to linearize outputs of the low pass electrical filtering circuit in the electrical domain and output a linearized quadrature signal and a linearized in-phase signal;
    an optical modulator biased at a transmission null point and receiving the linearized quadrature signal and the linearized in-phase signal from the linearization circuit;
    wherein the linearization circuit reduces a modulation index for the optical modulator to approximately 50%;
    wherein the low pass filtering circuit is configured with an adjustable pass-band equal to an optical bandwidth of a modulated optical signal produced by the modulator; and
    wherein signal paths for the linearized quadrature signal and the linearized in-phase signal do not include a digital to analog converter (DAC) between the linearization circuit and the optical modulator.

2. The system of claim 1, wherein the electrical filtering circuit is configured to suppress interference terms.

3. The system of claim 1, wherein the electrical filtering circuit is configured to implement one of a Bessel, a Butterworth, a Chebyshev, and an Elliptic filter.

4. The system of claim 1, wherein the electrical filtering circuit is part of a complementary metal-oxide-semiconductor integrated circuit with additional modulator functions of the optical modulator.

5. The system of claim 1, wherein the signal linearization circuit is configured to implement an ARCSIN($V_{in}$) function.

6. The system of claim 1, wherein the electrical filtering circuit and the signal linearization circuit are part of a complementary metal-oxide-semiconductor integrated circuit with additional modulator functions of the modulator.

7. The system of claim 1, wherein the modulator is part of a wavelength division multiplexed system comprising a plurality of optical channels each with a single-stream modulation format of the data stream on a single wavelength carrier.

8. The system of claim 7, wherein the single-stream modulation format comprises one of Return-to-Zero (RZ), Return-to-Zero Differential Phase Shift Keying (RZDPSK), Quadrature Phase Shift Keying (QPSK), Differential Quadrature Phase Shift Keying (DQPSK), Polarization Multiplexing, and combinations thereof.

9. A method for electrical domain suppression of linear crosstalk in an optical communication system, comprising:
    adapting an input signal for modulation;
    splitting the input signal into a quadrature signal and an in-phase signal;
    electrically filtering the adapted and split input signal utilizing an analog, electrical, radio frequency (RF) domain, low pass filtering circuit;
    linearizing the electrically filtered signal in the electrical domain utilizing an analog signal linearization circuit to output a linearized quadrature signal and a linearized in-phase signal; and
    modulating a laser with an optical modulator biased at a transmission null point that receives the linearized quadrature signal and the linearized in-phase signal from the linearization circuit, wherein the linearization circuit reduces a modulation index for the optical modulator to approximately 50%;
    wherein the low pass filtering circuit is configured with an adjustable pass-band equal to an optical bandwidth of a modulated optical signal produced by the modulator; and
    wherein signal paths for the linearized quadrature signal and the linearized in-phase signal do not include a digital to analog converter (DAC) between the linearization circuit and the optical modulator.

10. The method of claim 9, wherein the electrically filtering implements one of a Bessel, a Butterworth, a Chebyshev, and an Elliptic filter.

11. The method of claim 9, wherein the linearizing is configured to provide electrical-to-optical transfer function linearization.

12. The method of claim 11, wherein the linearizing comprises implementing an ARCSIN($V_{in}$) function.

13. The method of claim 9, wherein the electrically filtering and linearizing are implemented using a modulator comprising a complementary metal-oxide-semiconductor integrated circuit.

14. The method of claim 9, further comprising:
    combining a plurality of modulated optical wavelengths in a wavelength division multiplexed optical system;
    wherein the adapting, splitting, electrically filtering, linearizing, and modulating steps are performed on at least one of the plurality of modulated optical wavelengths.

15. A wavelength division multiplexed system with electrical domain suppression of linear crosstalk, comprising:
    a plurality of optical transmitters; and
    an optical combiner connected to each of the plurality of optical transmitters and configured to multiplex the plurality of optical transmitters;
    wherein at least one of the plurality of optical transmitters comprises:
        an analog, electrical, radio frequency (RF) domain, low pass, filtering circuit adapted to receive a data stream that is split into a quadrature signal and an in-phase signal;
        an analog signal linearization circuit configured to linearize outputs of the analog electrical filtering circuit in the electrical domain and output a linearized quadrature signal and a linearized in-phase signal;
        an optical modulator biased at a transmission null point and receiving the linearized quadrature signal and the linearized in-phase signal from the linearization circuit, wherein the linearization circuit reduces a modulation index for the optical modulator to approximately 50%;
        wherein the analog electrical filtering circuit is configured with an adjustable pass-band equal to an optical bandwidth of a modulated optical signal produced by the modulator; a frequency channel spacing of a wavelength division multiplexed system; and
        wherein signal paths for the linearized quadrature signal and the linearized in-phase signal do not include a digital to analog converter (DAC) between the linearization circuit and the optical modulator.

16. The wavelength division multiplexed system of claim 15, wherein the signal linearization circuit is configured to implement an ARCSIN($V_{in}$) function.

17. The wavelength division multiplexed system of claim 16, wherein the electrical filtering circuit and the signal linearization circuit are part of a complementary metal-oxide-semiconductor integrated circuit contained in the at least one of the plurality of optical transmitters.

18. The wavelength division multiplexed system of claim 16, wherein the plurality of optical transmitters each comprise an output optical signal with a single-stream modulation format comprising one of Return-to-Zero (RZ), Return-to-Zero Differential Phase Shift Keying (RZDPSK), Quadrature Phase Shift Keying (QPSK), Differential Quadrature Phase Shift Keying (DQPSK), Polarization Multiplexing, and combinations thereof.

* * * * *